US011526931B2

(12) United States Patent
Vilcovsky (10) Patent No.: US 11,526,931 B2
(45) Date of Patent: Dec. 13, 2022

(54) SYSTEMS AND METHODS FOR DIGITAL MIRROR (71) Applicant: EyesMatch Ltd., Tortola (VG)

(72) Inventor: Nissi Vilcovsky, Tokyo (JP)

(73) Assignee: EYESMATCH LTD., Tortola (VG)

( * ) Notice: Subject to any disclaimer, the term of this patent is extended or adjusted under 35 U.S.C. 154(b) by 809 days.

(21) Appl. No.: 15/924,062

(22) Filed: Mar. 16, 2018

(65) Prior Publication Data
US 2018/0268472 A1 Sep. 20, 2018

Related U.S. Application Data (60) Provisional application No. 62/472,508, filed on Mar. 16, 2017.

(51) Int. Cl.
G06Q 30/00 (2012.01)
G06Q 30/06 (2012.01)
(Continued)

(52) U.S. Cl.
CPC ......... G06Q 30/0643 (2013.01); G06N 5/047 (2013.01); G06Q 10/087 (2013.01);
(Continued)

(58) Field of Classification Search
CPC ..... G06Q 30/0601–0645; G06Q 30/08; G06Q 10/087; G06N 5/047; H04L 65/60; H04L 65/605
(Continued)

(56) References Cited

U.S. PATENT DOCUMENTS 10,346,893 B1 * 7/2019 Duan ................. G06F 16/9535
2010/0023404 A1 * 1/2010 Elgort ................ G06Q 30/0267
705/14.64
(Continued)

OTHER PUBLICATIONS

Are Digital Mirrors the next big retail trend? by Reality interactive, Jan. 14, 2015. https://realityi.com/news/digital-mirrors-next-big-retail-trend/ (Year: 2015).*

(Continued)

Primary Examiner — Jeffrey A. Smith
Assistant Examiner — Lindsey B Smith
(74) Attorney, Agent, or Firm — Womble Bond Dickinson (US) LLP; Joseph Bach, Esq.

(57) ABSTRACT

A network of interconnected digital mirrors within a mall. A plurality of digital mirrors are installed in a participating stores, each comprising a digital screen, a video camera positioned to generate video stream of a user in front of the digital mirror, and a microprocessor. A centralized database stores merchandize data of participating stores. A controller is coupled to the mirrors and the centralized database and preprogrammed to perform the operations comprising: receiving the video stream from the video camera of one of the plurality of digital mirrors; identifying a merchandize item within the video stream; activating a recommendation
(Continued)

engine to identify a complementary item from the centralized database that is complementary to the identified merchandize item; sending data regarding the complementary item and a store offering the complementary item to the digital mirror for display.

18 Claims, 3 Drawing Sheets

(51) Int. Cl.
    *G06N 5/04* (2006.01)
    *G06Q 10/08* (2012.01)
    *H04L 65/60* (2022.01)
    *G06Q 30/02* (2012.01)
    *H04L 65/75* (2022.01)

(52) U.S. Cl.
    CPC ..... *G06Q 30/0201* (2013.01); *G06Q 30/0631* (2013.01); *G06Q 30/0639* (2013.01); *H04L 65/60* (2013.01); *H04L 65/765* (2022.05)

(58) Field of Classification Search
    USPC ................................................ 705/26.1–27.2
    See application file for complete search history.

(56) References Cited

U.S. PATENT DOCUMENTS

| | | | |
|---|---|---|---|
| 2010/0030578 A1* | 2/2010 | Siddique | G06Q 30/06 705/3 |
| 2012/0123673 A1* | 5/2012 | Perks | G06Q 30/0625 705/26.7 |
| 2014/0063056 A1* | 3/2014 | Zhong | G06T 11/00 345/633 |
| 2014/0236728 A1* | 8/2014 | Wright | G06Q 30/0267 705/14.58 |
| 2016/0063588 A1* | 3/2016 | Gadre | G06Q 30/0643 705/26.61 |
| 2016/0117763 A1* | 4/2016 | Cypher | G06Q 30/0251 235/375 |
| 2017/0358135 A1* | 12/2017 | Trehan | G06T 19/006 |
| 2018/0137523 A1* | 5/2018 | Kim | G06F 3/165 |

OTHER PUBLICATIONS

Steele, B, "Neiman Marcus' Digital Mirror Compares Clothes Side by Side", Jan. 13, 2015, accessed at [https://www.engadget.com/2015-01-13-neiman-marcus-memory-mirror.html] (Year: 2015).*

* cited by examiner

SYSTEMS AND METHODS FOR DIGITAL MIRROR

CROSS-REFERENCE TO RELATED APPLICATIONS

This application claims the benefit of, and priority to, U.S. Provisional Patent Application No. 62/472,508, filed on Mar. 16, 2017, the entire disclosure of which is incorporated herein by reference.

BACKGROUND

1. Field

This disclosure relates to digital connection of stores in shopping areas, such as malls, strip malls, etc., using digital mirrors and, more specifically, to digital mirrors and network that are specifically configured for improving service in the shopping area and in between stores.

2. Related Art

The conventional shopping area, such as a mall, strip mall, etc., is a collection of stores, mostly unrelated to each other and, other than being housed in the same building or in close geographical area, having no collaboration with each other. Consequently, the shopping experience among the stores is somewhat disconnected. For example, a shopper in one store cannot tell whether a different store has complementing merchandize, unless the buyer goes to the other store and view its offerings. Moreover, unlike on the Internet, once the shopper leaves the mall, nobody "remembers" the shopper or knows what the shopper has tried or the general behavior of shoppers in the mall.

Applicants have previously disclosed novel technologies for converting and transforming a still image or 2D or 3D video created by one or more cameras, with or without other sensors, into a digital mirror. Examples of Applicants' embodiments are described in, e.g., U.S. Pat. Nos. 7,948,481 and 8,982,109. The embodiments disclosed therein can be implemented for any general use of a mirror. Applicant followed with further disclosures relating to adapting the mirror to specific needs, such as, e.g., clothing stores, makeup, eyewear, shoes, etc. Examples of Applicants' embodiments are described in, e.g., U.S. Pat. Nos. 8,976,160 and 8,982,110.

This disclosure relates to further improvements of the digital mirror. The improvements enable a more seamless shopping experience and help manage the mall and stores and merchandize within the mall.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments consolidate the shoppers' experience in a shopping area, such as a mall. Various embodiments utilize any of the digital mirrors previously disclosed by Applicant, augmented to enable a more seamless shopping experience in a mall or a collection of stores. The disclosed embodiments bridge the real-world and the virtual, i.e., online, shopping experiences. The embodiments also enable improved management of the stores and their inventory, and the mall itself.

According to disclosed embodiments, a main directory mirror is provided. The directory mirror enables user to perform search for products or stores, select a product or a store and call the appropriate store directly from the mirror, send direction to the store from the mirror to the user's mobile device, send information to a corresponding store regarding a product the user is interested in, etc. The directory mirror may also automatically analyze the images of the user and determine the user's characteristics, such as gender, age, hair color, skin complexion, height, etc., to enable the mirror to generate recommendations to the user for products available for purchase in the mall. The mirror may also enable the user to enter the user's characteristics, and thereafter update or override the mirror's determinations.

Additionally, personal mirrors are distributed among the stores within the mall. The personal mirrors generally perform the same functions as disclosed in Applicants prior disclosures, but are augmented to also provide recommendations for other merchandize available, whether in the same or other store within the mall. The personal mirrors can use augmented reality to show the shopper wearing the suggested merchandize.

Disclosed embodiments further provide a method for interconnecting stores within a shopping mall, the method comprising: distributing a plurality of digital mirrors among the stores, wherein each digital mirror comprises a camera, a display screen, and a processor configured to receive live stream from the camera and transform the live stream to mimic images projected by a mirror; providing a main server and configuring the main server to maintain a real-time products database; periodically uploading to the main server list of products available at the stores and updating the real-time product database; interconnecting the plurality of mirrors to the main server; forming a wireless communication system enabling transmission of data from each of the digital mirrors to users' mobile devices; programming each of the digital mirrors to present to the user products from the real-time database; and, when a user selects a product presented on one of the digital mirrors, operating the digital mirror to wirelessly send product data to the user's mobile device.

In disclosed embodiments the server may also be configured to analyze video streams from the distributed digital mirrors and provide analytics regarding shoppers' behavior within the mall. According to one example the server is configured to generate a traffic map providing data indicative of where customers usually go. This can help identify mall traffic patterns and trends to assist in management of the mall. The analytics can also be used by the recommendation engine to generate recommendations based on merchandize purchased by prior shoppers.

According to disclosed aspects, a method for interconnecting stores within a shopping mall is provided, comprising: distributing a plurality of digital mirrors among the stores, wherein each digital mirror comprises a camera, a display screen, and a processor; providing a main server and operating the main server to maintain a real-time products database; periodically uploading to the main server list of products available at the stores and updating the real-time product database; interconnecting the plurality of mirrors to the main server; operating the processor of each of the digital mirrors to perform the steps: receive live video stream from the camera and transform the live video stream to mimic images projected by a mirror; analyze the live video stream to determine characteristics of clothing items appearing in the video stream; search the real-time product database for complementary product; and, display an image of the complementary product on the digital mirror.

The processor may perform the further step comprising: when a user selects the complementary product, wirelessly sending product data to the user's mobile device. Displaying an image of the complementary product may comprise identifying body elements within the live video stream and superimposing an image of the complementary product over an appropriate body element to simulate the user wearing the complementary product. The processor may also perform the further step comprising: analyze the live video stream to determine attributes of users appearing in the live video stream and sending the attributes to the main server. The main server can maintain an attributes database and generate complementary product recommendations based on the attributes database. The main server can also analyze the live video streams from the digital mirrors to identify items tried on by shoppers, and generate a report of all items tried on by shoppers. The main server can further performs the steps of: analyzing plurality of video streams from the plurality of digital mirrors to identify common shopping patterns of users; and, generating merchandize recommendations based on the common shopping patterns.

Aspects of the invention include a network of interconnected digital mirrors, comprising: a plurality of digital mirrors, each installed in a participating store; each of the a digital mirrors comprising a digital screen, a video camera positioned to generate video stream of a user in front of the digital mirror, and a microprocessor; a centralized database storing merchandize data of participating stores; a controller coupled to the plurality of digital mirrors and to centralized database and preprogrammed to perform the operations comprising: receiving the video stream from the video camera of one of the plurality of digital mirrors; identifying a merchandize item within the video stream; activating a recommendation engine to identify a complementary item from the centralized database that is complementary to the identified merchandize item; sending data regarding the complementary item and a store offering the complementary item to the digital mirror for display. The recommendation engine can be programmed to analyze plurality of video streams from the plurality of digital mirrors to identify common shopping patterns of users; and, to generate merchandize recommendations based on the common shopping patterns. The controller can further perform the operation comprising generating a report corresponding to the common shopping patterns of users. The controller can further be programmed to wirelessly send the data regarding the complementary item to a user's mobile device. When one of the digital mirrors receives the data regarding the complementary item, the digital mirror can be programed to implement augmented reality by modifying the live video stream to include an image of a complementary item appearing to be on the user.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Embodiments of the invention involve both hardware and software designs that are particularly tailored for use as a stores-linking digital mirror, i.e., situations wherein a plurality of unrelated stores located in close proximity can be linked so as to provide a user with a seamless shopping experience. The stores-linking digital mirror can also provide data for improving management of the mall and the stores therein. Additionally, the stores-linking digital mirror can be used for cross-selling among stores.

Figure 1:
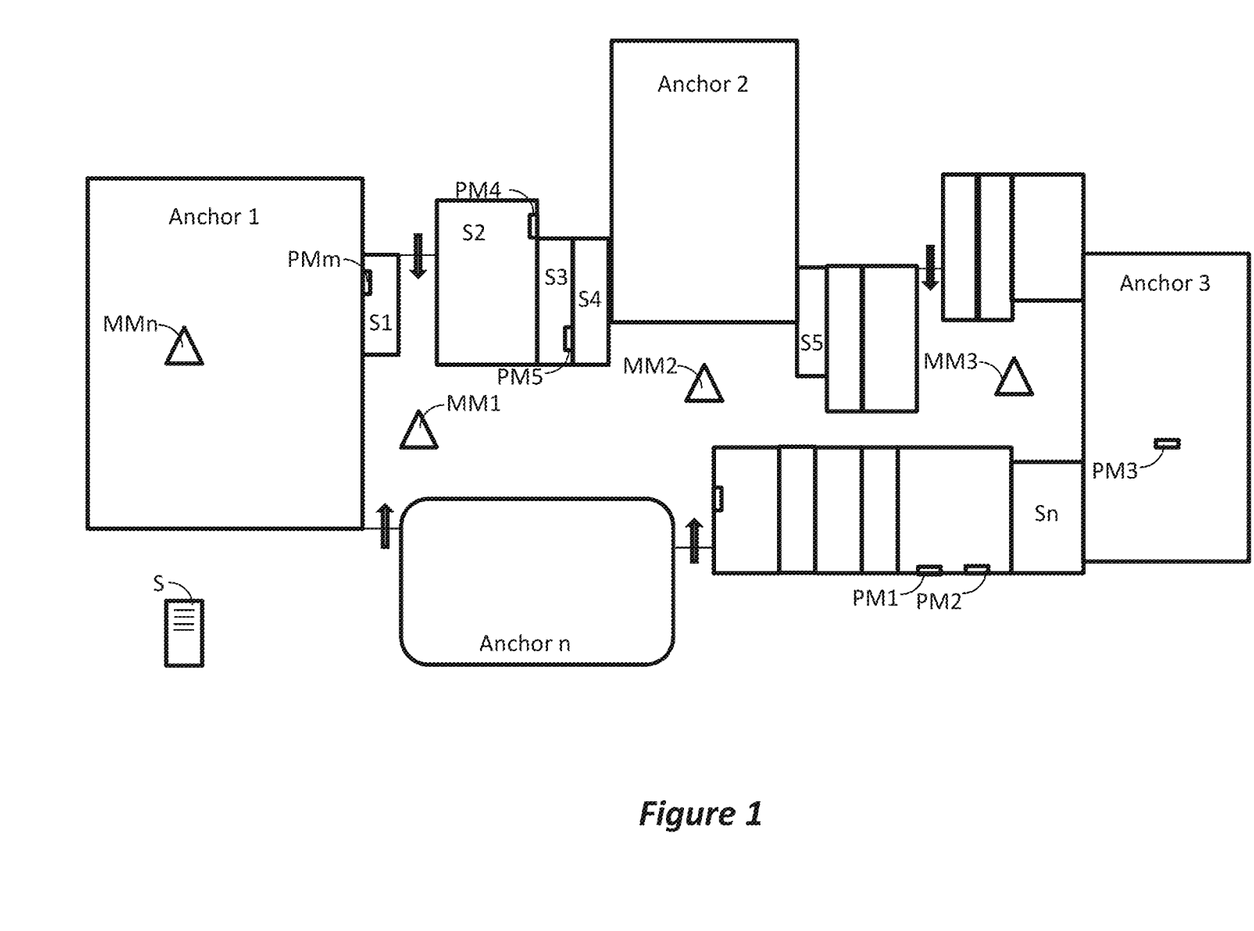
FIG. 1 is a diagram illustrating a layout of a mall according to one embodiment.

FIG. 1 is a diagram illustrating a layout of a mall, having several anchor stores, Anchor 1-$n$, and a plurality of smaller stores S1-$m$. The mall includes public spaces that can be accessed by shoppers from the anchor stores or from the mall entrances, indicated by the block arrows. In the embodiment of FIG. 1 two types of digital mirrors are used: main mirrors MM1-MMn, and personal mirrors PM1-PMm. While in general the mirrors can be the same, in this embodiment the main mirrors function more like a directory and search facility, while the personal mirrors function as merchandize try-on mirrors.

In the embodiment of FIG. 1, all of the mirrors are linked via server S, which may reside in the mall forming an intranet, or in the cloud, connected via the Internet. Also, a wireless system may be available in the mall, through which the mirrors may communicate with personal mobile devices of shoppers. Alternatively, the mirrors may communicate with mobile devices using cellular network, Bluetooth, etc.

Thus, when a particular action is taken by the mirror, it is possible to send data from the mirror to the mobile device, as will be described below.

A local merchandize database resides in the server. Each subscribed store feeds to the merchandize database its current "on-hand" inventory. The on-hand inventory is a list of items that are available for purchase at the store at that particular moment. Consequently, the merchandize database includes a listing of all available merchandize available for purchase at subscribed stores within the mall.

Each of the main digital mirrors may have a directory module that displays an interactive map of the mall, such as that shown in FIG. 1. A user may touch a particular store on the screen, and be able to see the merchandize available for purchase at that store on that day. If a user clicks on a store and then click on an item the user is interested in purchasing, the user may be given the option to upload directions to the store to the user's own mobile device. The mirror may then send to the user's mobile device data that may include the name of the store, its location within the mall, and the data about the item. Optionally, the mirror may also send the product data to the store, so that the store may be prepared to show the item to the user.

Figure 2:
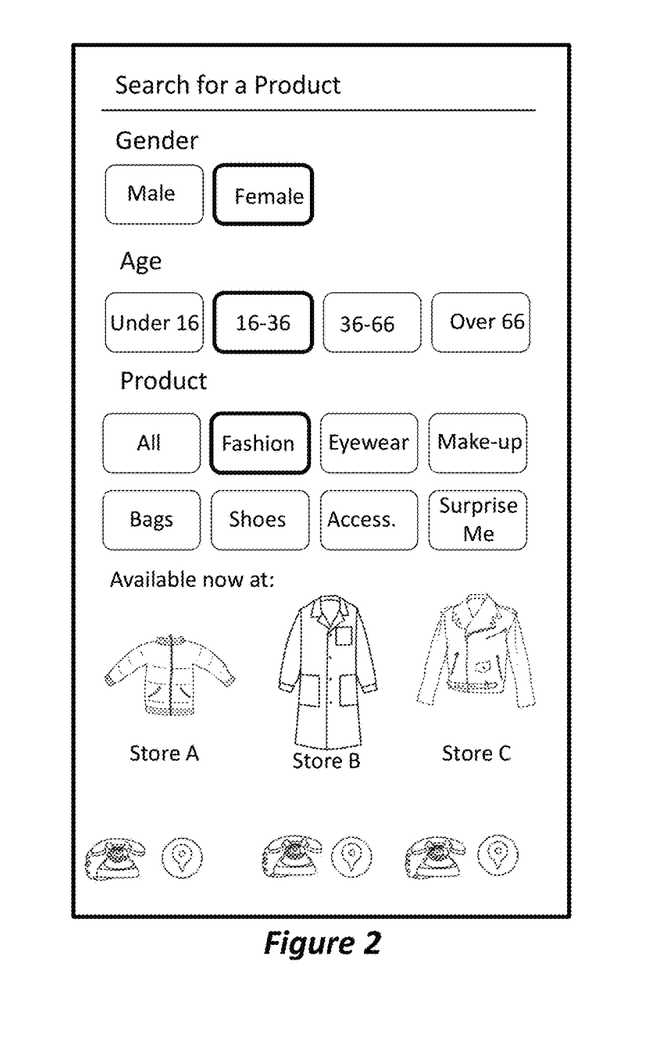
FIG. 2 depicts an embodiment of screenshot of a main mirror situated in public area of a mall.

Each of the main mirrors MM1-MMn can also include a search module that enables the users to browse and search items available for purchase inside the mall. FIG. 2 is an illustration of an example for a screenshot of the main mirror in search mode. The search module enables a user to either enter search terms to search for a product, or simply click on pre-programmed categories. In the example of FIG. 2, a user selected "female" age "16-36" and "fashion". The search module then returns images of products found in the local merchandize database and display images of available products. If a user selects a product, the user is given the option to upload directions to the corresponding store to the user's own mobile device. The mirror may then send to the user's mobile device data that may include the name of the store, its location within the mall, and the data about the item. Optionally, the mirror may also send the product data to the store, so that the store may be prepared to show the item to the user.

The main mirrors can be distributed in the common areas of the mall, in large stores, such as the anchor stores, and anywhere a mall directory or a search engine may be deemed to be appropriate. Conversely, the personal mirrors are more appropriate in individual stores. The main function of the personal mirror is to function as a digital mirror, as disclosed in Applicant's prior disclosures. That is, the personalized mirrors can be used for try-ons of clothes, shoes, eyewear, make-up, etc. The digital mirror enables side-by-side comparisons of various try-ons, enables sharing the try-ons with other people, e.g., via social network, etc.

Figure 3:
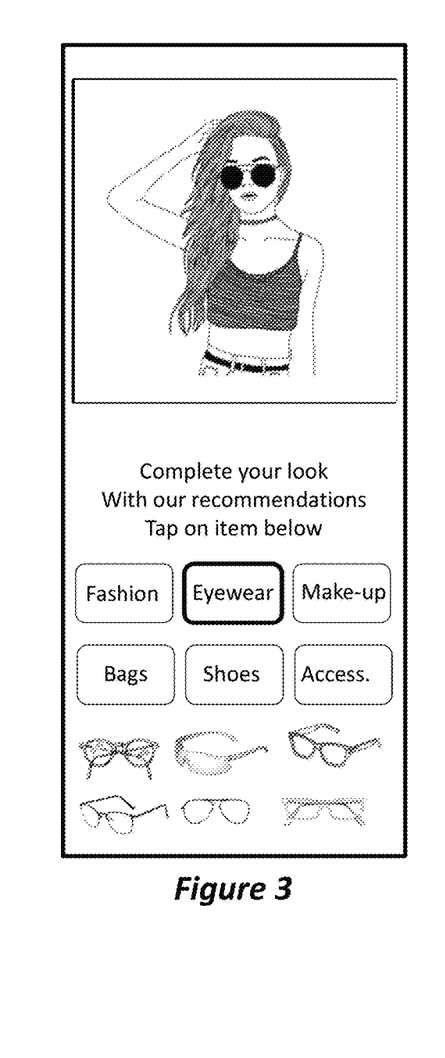
FIG. 3 depicts an embodiment of augmented reality module that can provide complementing recommendations to a shopper.

Each of the personal mirrors may also include a complementing module. An example of a screen shot from a personal mirror is illustrated in FIG. 3. An upper section of the digital mirror is operated to project an image of the user, mimicking a mirror image. The bottom section of the digital mirror is dedicated to display from the complementing module. Specifically, the complementing module analyzes the images of the user and searches the local merchandize database for items that may complement the items that the user is currently wearing. The complementing module displays the found items on the bottom half of the digital mirror's screen. Then, when a user selects one of the items, the complementing module may virtually "place" the item on the user, for the user to see how the item may look. If the user likes the item, the user is provided the option of downloading data related to the store and the item to the user's mobile device. Optionally, the data may also be sent to the corresponding store. In this manner, the shopper can find out about items that are available in other stores, without the need to go and search for items in those other stores.

The complementing module may operate using various mechanisms. For example, the complementing module may be preprogrammed to match items by style, color, and other attributes of the items themselves. The complementing module may be also preprogrammed to match items by attributes of the shopper, e.g., hair color, body shape, height, etc. The complementing module may also implement artificial intelligence learning, by noting the items other users try in front of the mirrors throughout the mall. As more users try out item combinations, the complementing module can learn patterns of behaviors of shoppers and learn to recommend matching items according to observations made of prior users.

The complementing module may also learn collective data points of users. For example, the complementing module may observe body shape, skin complexion, hair color, person height, etc. of many users trying items in the mirrors. The complementing module may then develop a database of items that users of similar data points have tried out, and recommend these items to the next user matching the data points.

Figure 4:
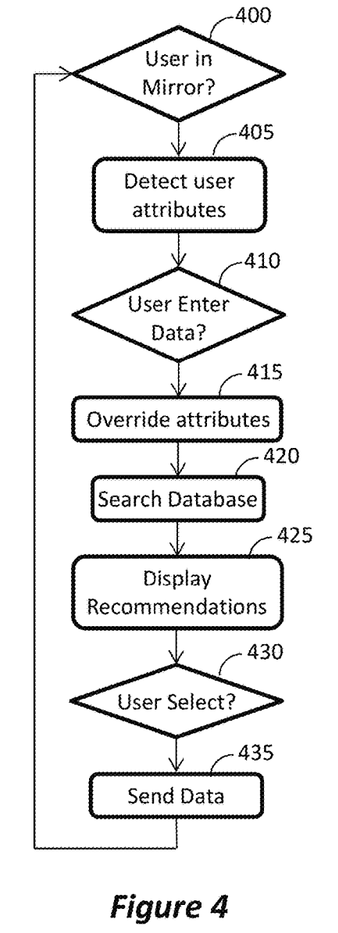
FIG. 4 is a flow chart illustrating a process that can be executed by any of the digital mirrors, according to one embodiment.

FIG. 4 is a flow chart illustrating a process that can be executed by any of the digital mirrors, according to one embodiment. At initial step 400 the processor of the mirror recognizes whether a user is standing in front of the mirror by analyzing the video feed from the mirror's camera. If a user is in front of the mirror, in step 405 the processor analyzes the video stream to determine various attributes or characteristics of the user, e.g., gender, age, height, etc., and stores that information for further processing. If in step 410 a user enter any data, e.g., gender, age or height, at step 415 the processor overrides the corresponding initial estimated attributes data. In step 420 the processor uses the data to search the database for item matching for recommendation to the user. In step 425 the processor displays the items on the mirror's monitor. If at 430 the user selects one of the displayed items, at step 435 the processor sends the corresponding data to the user's mobile device and/or the corresponding store.

Figure 5:
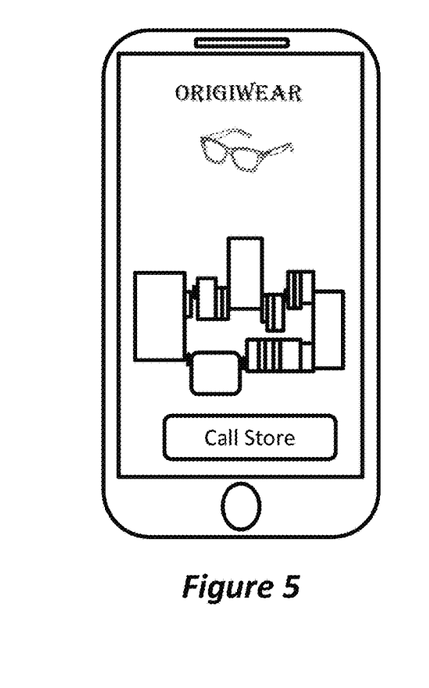
FIG. 5 illustrates an example of a screenshot of a user's mobile device having product data received from the digital mirror.

FIG. 5 is an illustration of a screenshot of a user's mobile device after receiving the data transmission form the mirror. The data transmission is sent from the mirror to the mobile device wirelessly. This may be done, e.g., by using the mall's WiFi system, using cellular network, using Bluetooth or NFC, etc. Using WiFi system, the user may be asked to log on to the mall's WiFi facility. Conversely, using cellular network, the user may be asked to enter the user's mobile number on the mirror, and then the mirror can send the data in the form of, e.g., a text message to the mobile number.

As shown in FIG. 5, the data sent from the mirror and displayed on the shopper's mobile device may include the name of the store, a picture of the item selected, a map of the mall, highlighting the location of the store where the item may be purchased, a call button to call the store directly, etc.

In step 410, if a user enters a store name, the processor may use that data to search items only offered for sale in that store. Moreover, if the user selects a store and likes an item displayed in the mirror, the user can use the mirror's connectivity to call the store directly from the mirror. This is illustrated in FIG. 2, by the phone icon displayed with the item. To get directions to the store, the user may touch the map icon displayed next to the phone icon (see, FIG. 2). The directions may then be displayed on the mirror, but may also be sent to the user's mobile device to provide the user with walking directions to the store.

Thus, the embodiments disclosed herein provide a method for interconnecting stores within a shopping mall, strip mall, etc. The method involves the steps comprising distributing a plurality of digital mirrors among the stores, wherein each digital mirror comprises a camera, a display screen, and a processor configured to receive live stream from the camera and transform the live stream to mimic images projected by a mirror. Also, digital mirrors can be distributed in common areas of the mall, wherein these mirrors can also be programmed to function as directories for the mall. A main server is provided and configuring to maintain a real-time products database by periodically uploading to the main server lists of products available at the stores and updating the real-time product database. A network is provided, interconnecting the plurality of mirrors to the main server. Also, a wireless communication system is formed, enabling transmission of data from each of the digital mirrors to users' mobile devices, e.g., via WiFi, cellular, Bluetooth, etc. Each of the digital mirrors is programmed to present to the user products from the real-time database, and, when a user selects a product presented on one of the digital mirrors, the digital mirror is programmed to wirelessly send product data to the user's mobile device and/or to the store offering the product.

FIG. 3 also depicts the operation of an augmented reality module that can change the appearance of the image from the video camera. Specifically, the video stream from the camera undergoes transformation in order to present an image on the digital mirror that resembles or mimics an image that would be reflected from a mirror. Additionally, when activated, as the shopper selects an item from the available merchandize database, the augmented reality module can modify the video stream to simulate the shopper wearing the item. In the example illustrated in FIG. 3, as the user selects one of the eyewear presented, the augmented reality module generate a digital image of the selected item and digitally adds the digital image onto the video stream.

The augmented reality module can have the capability of analyzing the video stream and determining facial and body features of the shopper appearing in the video stream. The augmented reality module also has the ability to detect and predict movement and orientation of facial and body parts, and use this information to modify the video stream to include the digital image of the selected product. The augmented reality module can analyze the video stream to identify body elements within the live video stream and superimpose an image of the complementary product over an appropriate body element to simulate the user wearing the complementary product. In the example depicted in FIG. 3, the augmented reality module determines the collection of pixels that belong to the shopper's relevant facial features, in this case, e.g., eyes and nose, and determines which pixels need to be modified in order to depict the eyewear over the eyes of the shopper. The augmented reality then tracks the relevant facial features of the shopper in order to change the appeared location of the digital item in order to provide a convincing augmented reality as if the shopper actually wears the glasses. The mirror may then provide the option to the user to download the augmented reality image or video to the shopper's mobile device.

Figure 6:
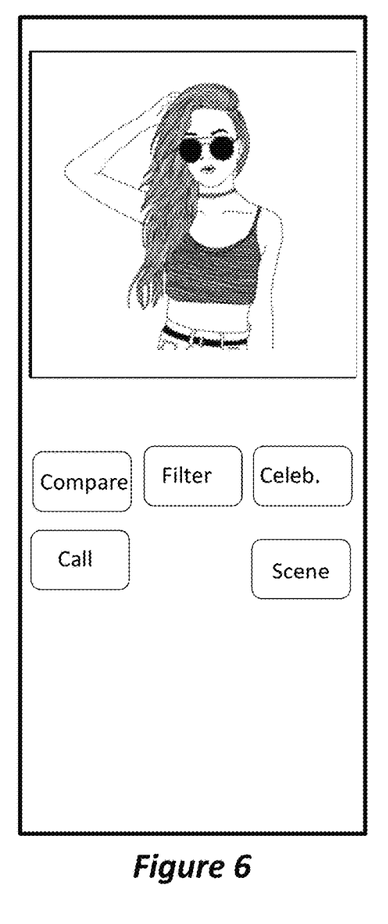
FIG. 6 illustrates a screenshot of a digital mirror with various options, including augmented reality, according to one embodiment.

FIG. 6 illustrates other options that may be implemented in the digital mirror, some of which utilize the augmented reality module. Specifically, during a session the shopper may be able to compare a current session with a prior recorded session. The shopper may also be able to call a friend directly from the mirror, and establish a video link so that the friend can see the images projected on the digital mirror. The shopper may also be able to select different filters, to see how the item would look under different lighting conditions. Similarly, the shopper may be able to select different background scenes, which will be added to the video using the augmented reality module. The Augmented reality module can also be used to include an image of a selected celebrity on the digital mirror, in addition to the user's image, thus making the impression that the user is standing in front of the digital mirror together with the celebrity.

The main server illustrated in FIG. 1 also operates to help management of the mall and the merchandize. That is, the main server can provide analytics about shoppers' behavior in the mall. For example, the main server can utilize the videos collected from the mirrors in order to analyze shoppers' patters, e.g., which stores are visited the most, in which order stores are usually being visited, which merchandize are being tried but few purchase, etc. The main server can then generate reports of the shoppers' behavior. For example, the main server can generate maps of the mall with lines drawn to show normal walking patterns of shoppers. Also, the live video streams from the digital mirrors can be analyzed to identify various items tried on by shoppers, and generate a report of all items tried on by users. In this manner, the digital mirror system bridges the online and real world shopping, as unlike in online, in the real world there's no way for shop keepers to track the items that have been tried on by shoppers.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A method for interconnecting stores in a mall, comprising:
distributing a plurality of digital mirrors among the stores, wherein each digital mirror comprises a camera, a display screen, and a processor configured to receive live video stream from the camera and transform the live video stream to mimic images projected by a mirror;
providing at least one main mirror having a directory module that displays an interactive map of the mall, and a search module that enables users to browse and search items available for purchase inside the mall;
providing a main server and configuring the main server to maintain a real-time products database;

periodically uploading to the main server list of products available at the stores and updating the real-time product database;
interconnecting the plurality of mirrors and the at least one main mirror to the main server;
forming a wireless communication system enabling transmission of data from each of the digital mirrors to users' mobile devices;
analyzing a live video stream from a camera of a corresponding digital mirror, of the plurality of digital mirrors, positioned in a first store to determine characteristics of clothing items appearing in the video stream;
searching the real-time products database for complementary products to the clothing items appearing in the video stream;
operating the corresponding digital mirrors to present to the user the complementary products from the real-time database; and,
determining that a user selected a complementary product from the presented complementary products, wherein the selected complementary product is from a corresponding store different from the first store, and operating the corresponding digital mirror to wirelessly send product data of the complementary product to the user's mobile device and additionally to send the complementary product data to the corresponding store.

2. The method of claim 1, wherein the wirelessly sending the product data to the user's mobile device comprises sending a mall map and directions to the corresponding store within the mall.

3. The method of claim 1, further operating the corresponding digital mirror to present a filter selection, each filter enabling the user to see how the selected product would look under different lighting conditions.

4. The method of claim 1, further comprising operating the corresponding digital mirror to analyze attributes of the user from the live video stream and generating merchandize recommendations based on the attributes.

5. The method of claim 1, further comprising operating the server to further performs the steps of:
analyzing plurality of video streams from the plurality of digital mirrors to identify common shopping patterns of users; and,
generating a report of shoppers' behaviors within the mall, the report including indication of which stores are visited the most, and in which order stores are usually being visited.

6. The method of claim 1, further comprising operating the corresponding digital mirror to implement augmented reality by modifying the live video stream to include an image of a virtual person in addition to a user image.

7. The method of claim 6, further comprising wirelessly sending an augmented reality video to the user's mobile device showing the virtual person as a selected celebrity.

8. The method of claim 1, further comprising operating the main server to further performs the steps of:
analyzing a plurality of video streams from the plurality of digital mirrors to identify common shopping patterns of users; and
generating a report of walking patterns of users.

9. A method for interconnecting stores within a shopping area, comprising:
distributing a plurality of digital mirrors among the stores, wherein each digital mirror comprises a camera, a display screen, and a processor;
providing at least one main mirror having a directory module that displays an interactive map of the shopping area, and a search module that enables users to browse and search items available for purchase within the shopping area;
providing a main server and operating the main server to maintain a real-time products database;
periodically uploading to the main server list of products available at the stores and updating the real-time product database;
interconnecting the plurality of mirrors and the at least one main mirror to the main server;
operating the processor of each of the digital mirrors to perform the steps of:
receiving a live video stream from the camera of a corresponding digital mirror positioned at a first store and transforming the live video stream to mimic images projected by a mirror;
analyzing the live video stream to determine characteristics of clothing items appearing in the video stream;
searching the real-time product database for a complementary product;
displaying an image of the complementary product on the corresponding digital mirror; and,
determining that a user selected the displayed complementary product, wherein the selected complementary product is from a complementary store different from the first store, and wirelessly sending product data of the complementary product to the user's mobile device and to the complementary store.

10. The method of claim 9, wherein the displaying the image of the complementary product comprises identifying body elements within the live video stream and superimposing the image of the complementary product over an appropriate body element to simulate the user wearing the complementary product.

11. The method of claim 9, further comprising operating the processor to perform the further step comprising: analyzing the live video stream to determine attributes of users appearing in the live video stream and sending the attributes to the main server.

12. The method of claim 11, further comprising operating the main server to maintain an attributes database and generate complementary product recommendations based on the attributes database.

13. The method of claim 11, further comprising operating the server to further performs the steps of:
analyzing plurality of video streams from the plurality of digital mirrors to identify common shopping patterns of users; and,
generating a report including indication of which stores are visited the most, and in which order stores are usually being visited.

14. The method of claim 9, further comprising operating the main server to analyze the live video streams from the digital mirrors to identify items tried on by shoppers, and generate a report of all items tried on by shoppers.

15. A system for interconnecting a plurality of brick-and-mortar stores using a network of interconnected digital mirrors within a shopping area, comprising:
a plurality of digital mirrors, each installed in a participating store, each of the digital mirrors comprising a digital screen, a video camera positioned to generate video stream of a user in front of the digital mirror, and a microprocessor;

at least one main mirror having a directory module that displays an interactive map of the shopping area, and having a search module that enables users to browse and search items available for purchase within the shopping area;

a centralized database storing merchandize data of participating stores and interconnected to the plurality of digital mirrors and the main mirror;

a controller coupled to the plurality of digital mirrors and to the centralized database and preprogrammed to perform the operations comprising: receiving the video stream from the video camera of one of the plurality of digital mirrors positioned at a first brick-and-mortar store; analyzing the video stream to identify a merchandize item within the video stream; analyzing the video stream to determine characteristics of merchandize appearing in the video stream; activating a recommendation engine to identify a complementary item from the centralized database that is complementary to the identified merchandize item; sending data regarding the complementary item to the one of the plurality of digital mirrors positioned at the first brick-and-mortar store for display; determining that a user selected the complementary item, wherein the selected complementary item is from a different brick-and-mortar store, and wirelessly sending product data of the complementary item to the user's mobile device and to the different brick-and-mortar store;

the controller further preprogramed to learn collective data points of users including body shape, skin complexion, hair color, and user height of users appearing in the mirrors, and to construct a database of items that users having similar data points have tried out.

16. The system of claim 15, further comprising wherein the recommendation engine is programmed to:

analyze plurality of video streams from the plurality of digital mirrors to identify common shopping patterns of users; and, generate merchandize recommendations based on the common shopping patterns.

17. The system of claim 16, wherein the controller further performs the operation comprising generating a report corresponding to the common shopping patterns of users, including walking patterns of users among the plurality of brick-and-mortar stores.

18. The system of claim 15, wherein when the one of the plurality of digital mirrors positioned at the first brick-and-mortar store receives the data regarding the complementary item, the digital mirror is programed to implement augmented reality by modifying the live video stream to include an image of the complementary item appearing to be on the user.

* * * * *